(12) United States Patent
Ikari et al.

(10) Patent No.: US 8,199,379 B2
(45) Date of Patent: Jun. 12, 2012

(54) OPTICAL DETECTION APPARATUS, AND SHEET PROCESSING APPARATUS HAVING THE OPTICAL DETECTION APPARATUS

(75) Inventors: Seiji Ikari, Yokohama (JP); Junji Miura, Naka-gun (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 520 days.

(21) Appl. No.: 12/548,832

(22) Filed: Aug. 27, 2009

(65) Prior Publication Data

US 2010/0214632 A1   Aug. 26, 2010

(30) Foreign Application Priority Data

Feb. 20, 2009   (JP) .................................. 2009-038203

(51) Int. Cl.
*H04N 1/04* (2006.01)
(52) U.S. Cl. ......... 358/475; 358/474; 358/486; 358/488
(58) Field of Classification Search .................. 358/475, 358/474, 486, 488, 491, 493
See application file for complete search history.

(56) References Cited

U.S. PATENT DOCUMENTS

| | | | | |
|---|---|---|---|---|
| 5,831,723 A | * | 11/1998 | Kubota et al. | 356/73 |
| 5,886,342 A | * | 3/1999 | Matsui | 250/208.1 |
| 7,248,730 B2 | * | 7/2007 | Matsui et al. | 382/135 |

FOREIGN PATENT DOCUMENTS

| | | |
|---|---|---|
| DE | 196 51 101 | 6/1998 |
| EP | 1 569 178 | 8/2005 |
| JP | 62-2691 Y2 | 1/1987 |
| JP | 3790931 B2 | 6/2006 |
| WO | WO 01/41079 | 6/2001 |

OTHER PUBLICATIONS

European Search Report dated Aug. 9, 2010.

* cited by examiner

*Primary Examiner* — Houshang Safaipour
(74) *Attorney, Agent, or Firm* — Pillsbury Winthrop Shaw Pittman, LLP (57) ABSTRACT

An optical detection apparatus includes a detector configured to detect image data in a predetermined reading area on a conveying path to convey the sheet, a first illuminator configured to intermittently emit an excitation light to a first illumination area including the reading area of the detector, a second illuminator configured to continuously emit an excitation light to a second illumination area which is continued with the first illumination area on the upstream of the first illumination area on the conveying path and which does not include the reading area of the detector, and a control unit configured to control the detector to detect image data of the sheet according to the emitting operation of the first illuminator.

6 Claims, 4 Drawing Sheets

OPTICAL DETECTION APPARATUS, AND SHEET PROCESSING APPARATUS HAVING THE OPTICAL DETECTION APPARATUS

CROSS-REFERENCE TO RELATED APPLICATIONS

This application is based upon and claims the benefit of priority from prior Japanese Patent Application No. 2009-038203, filed Feb. 20, 2009, the entire contents of which are incorporated herein by reference.

BACKGROUND OF THE INVENTION

1. Field of the Invention

The present invention relates to an optical detection apparatus, which detects light from a conveyed sheet, for example, and a sheet processing apparatus having the optical detection apparatus.

2. Description of the Related Art

A sheet processing apparatus for counting and identifying various kinds of sheets has been practically used. A sheet processing apparatus takes in sheets input to an input section one by one, and conveys it to the optical detection apparatus. The optical detection apparatus detects light from a sheet, and obtains an image based on the detected light. Based on the obtained image, a sheet processing apparatus determines the kind, authenticity, and possibility of re-circulation of a sheet. Based on the determination results, a paper processing apparatus sorts and stacks sheets.

On a sheet to be processed by a sheet processing apparatus, fluorescent printed information (first printed information) and phosphorescent printed information (second printed information) are printed. Fluorescent printed information is printed with ink including a fluorescent substance (fluorescent ink). A fluorescent substance is excited by an excitation light (e.g., ultraviolet light) emitted from an excitation light source, and becomes a state to emit light (fluorescence). If the emission of excitation light is interrupted, a fluorescent substance becomes a state not to emit light. Phosphorescent printed information is printed with ink including a phosphorescent substance (phosphorescent ink). A phosphorescent substance is excited by an excitation light (e.g., ultraviolet light) emitted from an excitation light source, and becomes a state to emit light. If the emission of excitation light is interrupted, a phosphorescent substance becomes a state to emit light that is gradually attenuated (afterglow).

A sheet processing apparatus has a fluorescence detector, which emits an excitation light from an excitation light source to a sheet, excites a fluorescent substance, detects fluorescence emitted from a fluorescent substance, and reads fluorescent printed information. A sheet processing apparatus has an afterglow detector, which emits an excitation light from an excitation light source to a sheet, excites a phosphorescent substance, detects afterglow emitted from a phosphorescent substance after the emission of excitation light is interrupted, and reads phosphorescent printed information.

For example, Jpn. Pat. Appln. KOKAI Publication No. 3790931 discloses a technology, which detects fluorescent light and afterglow by a reflective light-receiving system provided in both upstream and downstream of a conveying path on both sides of an ultraviolet lighting unit as an excitation source. In this case, the ultraviolet lighting unit is intermittently lit. In other words, fluorescence is detected when the ultraviolet lighting unit is lit, and afterglow is detected when the ultraviolet lighting unit is turned off.

Jpn. UM Appln. KOKOKU Publication No. 62-2691 discloses a technology, in which an ultraviolet lighting unit and a fluorescence detector are provided in the upstream of a conveying path, and an afterglow detector is provided in the downstream of a conveying path.

According to the technology disclosed in the above Jpn. Pat. Appln. KOKAI Publication No. 3790931, a sheet processing apparatus has two detectors for detecting fluorescence and afterglow. Thus, two processing systems are required for processing obtained images. This increases the system configuration and cost.

Further, when phosphorescent printed information is obtained by using the optical detection apparatus disclosed in the Jpn. UM Appln. KOKOKU Publication No. 62-2691, the time to detect afterglow after interruption of excitation light depends on a speed of conveying a sheet. The amount of attenuation of afterglow increases with time. Thus, when the speed of conveying a sheet is changed, the optical detection apparatus cannot correctly read phosphorescent printed information.

The amount of luminescence of an excitation light source changes with age. The sensitivity of a detecting element of the optical detection apparatus may change with age. Therefore, the optical detection apparatus having a reference fluorescent plate near a reading position is generally used. Such the optical detection apparatus corrects the level of a detected signal based on the level of a reference light detected by the reference fluorescent plate. This increases the accuracy of the optical detection apparatus. However, an excitation light source is not provided in the optical detection apparatus to detect afterglow in the downstream. Thus, even if a reference fluorescent plate is provided, a reference light cannot be detected. As a result, the optical detection apparatus in the downstream cannot be corrected.

Further, when fluorescence and afterglow are obtained by using the optical detection apparatus disclosed in the Jpn. Pat. Appln. KOKAI Publication No. 3790931, a sheet conveying speed cannot be increased. It is necessary to emit an excitation light for a certain period of time for exciting phosphorescent and fluorescent substances. However, an excitation light source repeats turning on and off whenever a sheet passes. Thus, if a conveying speed is increased, the time to emit an excitation light to a sheet is reduced. In other words, the levels of fluorescence and afterglow are changed depending on the conveying speed. Further, as the time to emit an excitation light to a sheet is short, fluorescent and phosphorescent substances may not be sufficiently excited.

BRIEF SUMMARY OF THE INVENTION

Accordingly, it is an object of the present invention to provide an optical detection apparatus configured to detect two or more light with different characteristics with a simple configuration, and a sheet processing apparatus having the optical detection apparatus.

According to one embodiment of the invention, there is provided an optical detection apparatus for detecting fluorescence and afterglow from a sheet printed with fluorescent substance and phosphorescent substance, comprising a detector configured to detect image data in a predetermined reading area on a conveying path to convey the sheet; a first illuminator configured to intermittently emit an excitation light to a first illumination area including the reading area of the detector; a second illuminator configured to continuously emit an excitation light to a second illumination area which is continued with the first illumination area on the upstream of the first illumination area on the conveying path and which does not include the reading area of the detector; and a control unit configured to control the detector to detect image data of the sheet according to the emitting operation of the first illuminator.

According to one embodiment of the invention, there is provided a sheet processing apparatus comprising a conveyer configured to convey a sheet along a conveying path; a detector configured to receive light from a predetermined reading area on the conveying path, and to detect image data of the sheet;

a first illuminator configured to intermittently emit an excitation light to a first illumination area including the reading area of the detector;

a second illuminator configured to continuously emit an excitation light to a second illumination area which is continued with the first illumination area on the upstream of the first illumination area on the conveying path and which does not include the reading area of the detector;

a control unit configured to control the detector to detect a fluorescent image and afterglow image of the sheet according to the emitting operation of the first illuminator;

a determination unit configured to determine whether the sheet is printed with fluorescent printed information and phosphorescent printed information or not based on a fluorescent image and phosphorescent image detected by the detector; and a sorting processor configured to determine a kind of the sheet based on the result of determination by the determination unit, and sort the sheet according to the kind of the sheet.

According to an embodiment of the invention, there is provided an optical detection apparatus configured to detect two or more light having different characteristics with a simple configuration, and a sheet processing apparatus having the optical detection apparatus.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

DETAILED DESCRIPTION OF THE INVENTION

Hereinafter, detailed explanation will be given of a optical detection apparatus according to an embodiment of the invention, and a sheet processing apparatus having the optical detection apparatus, with reference to the accompanying drawings.

Figure 1:
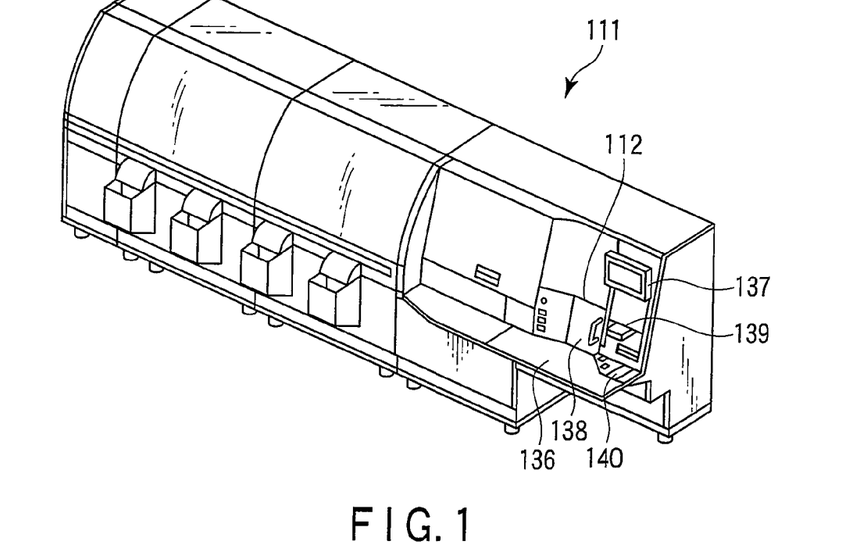
FIG. 1 is a schematic diagram for explaining an example of configuration of a sheet processing apparatus according to an embodiment of the invention.
Figure 2:
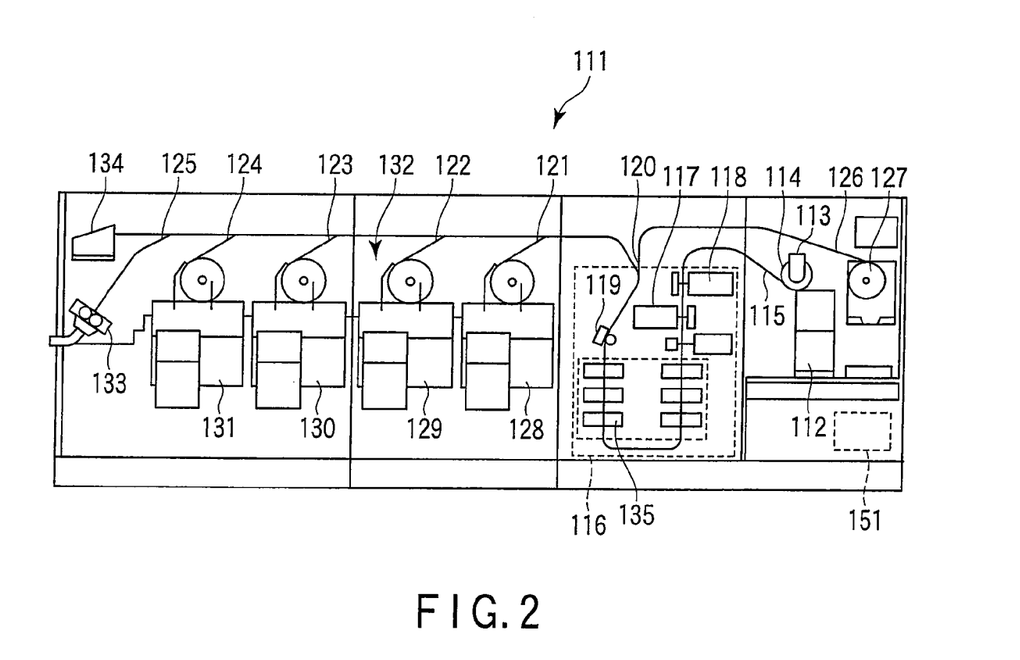
FIG. 2 is a schematic diagram for explaining an example of configuration of the sheet processing apparatus shown in FIG. 1.

FIGS. 1 and 2 are schematic drawings for explaining examples of configuration of a sheet processing apparatus 111 according to an embodiment of the invention. The sheet processing apparatus 111 inspects a sheet, and binds a reusable sheet.

On a sheet to be handled by the sheet processing apparatus 111 according to this embodiment, fluorescent printed information (first printed information) printed with fluorescent ink including a fluorescent substance, and phosphorescent printed information (second printed information) printed with phosphorescent ink including a phosphorescent substance, are printed.

Fluorescent and phosphorescent substances are excited by an excitation light such as an external light, heat, ultraviolet rays, and X-rays, and emit light. The amount of light emitted from fluorescent and phosphorescent substances is increased with the time of emitting an excitation light. When an excitation light is emitted for the emission saturation time determined for each material, the amount of light emitted from fluorescent and phosphorescent substances is saturated (saturated emission). The emission saturation time is time until the amount of emission is saturated.

Emission saturation time of A fluorescent substance is shorter than the time of a phosphorescent substance. Attenuation time of A fluorescent substance is shorter than the time of a phosphorescent substance. The attenuation time is time to transfer from a saturated emission state to a state not to emit light. In contract, a phosphorescent substance takes longer time to saturate emission than a fluorescent substance, and needs longer time to attenuate than a fluorescent substance.

Namely, when an excitation light is emitted by the saturation time of fluorescent substance, and then the emission of the excitation light is interrupted, a fluorescent substance becomes a state not to emit light. A phosphorescent substance becomes a state to emit afterglow for the attenuation time. The attenuation time is also determined for each material.

As shown in FIG. 1, the sheet processing apparatus 111 has an input unit 112, an operation unit 136, an operation/display panel 137, a door 138, a take-out opening 139, and a keyboard 140, outside of the apparatus.

The input unit 112 is configured to input a sheet. The input unit 112 accepts a stack of sheets. The operation unit 136 accepts operations input by an operator. The operation/display panel 137 displays operation guides and processing results for an operator. The operation/display panel 137 may be configured as a touch panel. In this case, the sheet processing apparatus 111 detects operations based on the buttons displayed on the operation/display panel 137, and the inputs to the operation/display panel 137 by the operator.

The door 138 opens and closes the input opening of the input unit 112. The take-out opening 139 is configured to take out a sheet from a stacker, which stacks a sheet determined unsuitable to reuse by the sheet processing apparatus 111. The keyboard 140 accepts operations input by an operator.

Further, as shown in FIG. 2, the sheet processing apparatus 111 has an input unit 112, a take-out unit 113, a suction roller 114, a conveying path 115, a inspection unit 116, gates 120 to 125, a rejection conveying path 126, a rejection stacker 127, stacker-binder 128 to 132, a cutter 133, and a stacker 134, inside of the apparatus. Further, the sheet processing apparatus 111 has a main control unit 151 to control all operations of the component units.

The take-out unit 113 is provided above the input unit. The take-out unit 113 is provided with a suction roller 114. The suction roller 114 is provided to contact the upper end of a stacking direction of a stack of sheets set in the input unit 112. In other words, the suction roller 114 rotates and takes in the sheets set in the input unit 112 one by one from the upper end of the stacking direction. The suction roller 114 takes out one sheet by one rotation, for example. Therefore, the suction roller 114 takes out a sheet at a constant pitch. A sheet taken in by the suction roller 114 is guided to the conveying path 115.

The conveying path 115 is a means of conveying a sheet to each component unit of the sheet processing apparatus 111. The conveying path 115 is provided with a not-shown conveying belt and driving pulley. The conveying path 115 drives a conveying belt with a not-shown driving motor. The conveying path 115 conveys a sheet taken in by the suction roller 114 at a constant speed by the conveying belt. The side of the conveying path 115 close to the take-out unit 113 is explained as an upstream hereinafter, and the side close to the stacker 134 as a downstream.

The inspection unit 116 is provided on the conveying path 115 extending from the take-out unit 113. The inspection unit 116 has an image reader 117, an image reader 118, a thickness checker 119, and the optical detection apparatus 135. The inspection unit 116 detects optical and magnetic characteristic information about a sheet. Thereby, the sheet processing apparatus 111 checks a sheet for kinds, front and back sides, authenticity, and stains/damage.

The image readers 117 and 118 are provided opposite to each other across the conveying path 115. The image readers 117 and 118 read images of both sides of a sheet conveyed on the conveying path 115. The image readers 117 and 118 are provided with a CCD camera. The sheet processing apparatus 111 obtains images of frontside and backside patterns of a sheet, based on the images read by the image readers 117 and 118.

The image readers 117 and 118 temporarily store the read images in a not-shown memory in the inspection unit 116. The sheet processing apparatus 111 displays the images stored in the memory on the operation/display panel 137 depending on an input instruction.

The thickness checker 119 checks the thickness of a sheet conveyed on the conveying path 115. For example, when the detected thickness is over a predetermined value, the sheet processing apparatus 111 checks an overlapped convey of sheets.

The optical detection apparatus 135 detects fluorescence and afterglow from a sheet conveyed on the conveying path 115, and obtains fluorescent and phosphorescent printed information. The optical detection apparatus 135 will be explained later in detail.

The inspection unit 116 is provided with a not-shown magnetic sensor. The magnetic sensor detects magnetic characteristic information of a sheet.

The gates 120 to 125 are sequentially provided on the conveying path 115 in the downstream of the inspection unit 116. The gates 120 to 125 are controlled by the main control unit 151. The main control unit 151 controls the operations of the gates 120 to 125 based on the inspection result of the inspection unit 116. Thereby, the main control unit 151 controls a sheet conveyed on the conveying path 115 to a predetermined processor.

The gate 120 provided immediately after the inspection unit 116 branches the conveying path 115 to the rejection conveying path 126. In other words, the gate 120 switches a path of conveying a sheet determined to be illegal and to be rejected, or a sheet impossible to check by the inspection unit 116, to the rejection conveying path 126 based on the inspection result of the inspection unit 116.

A rejection stacker (rejection unit) 127 is provided at the end of the rejection conveying path 126. The rejection stacker 127 stacks the above sheets determined to be rejected and impossible to check in the posture being taken out by the take-out unit 113. The sheets stacked in the ejection stacker 127 can be taken out from the take-out opening 139.

In the destinations branched by the gates 121 to 124, stacker-binder 128 to 131 (collectively called a stacker-binder 132) are provided. The stacker-binder 132 stacks regular sheets by kinds and front/back sides. Regular sheet is the sheet determined to be possible to reuse. The stacker-binder 132 binds and stores stacked sheets in a predetermined number.

In the destination branched by the gate 125, a cutter 133 is provided. The cutter 133 cuts and stores a sheet. A sheet conveyed to the gate 125 is a legal sheet, and a sheet (irregular sheet) determined to be impossible to reuse. In the other destination of a conveying path branched by the gate 125, a stacker 134 is provided. When a irregular sheet cut mode is selected, the main control unit 151 controls the gate 125 to convey a sheet to the cutter 133. When a irregular sheet cut mode is not selected, the main control unit 151 controls the gate 125 to convey a sheet to the stacker 134.

The main control unit 151 counts the number of the sheets stacked in the stacker-binder 132, and the sheets cut by the cutter 133.

Figure 3:
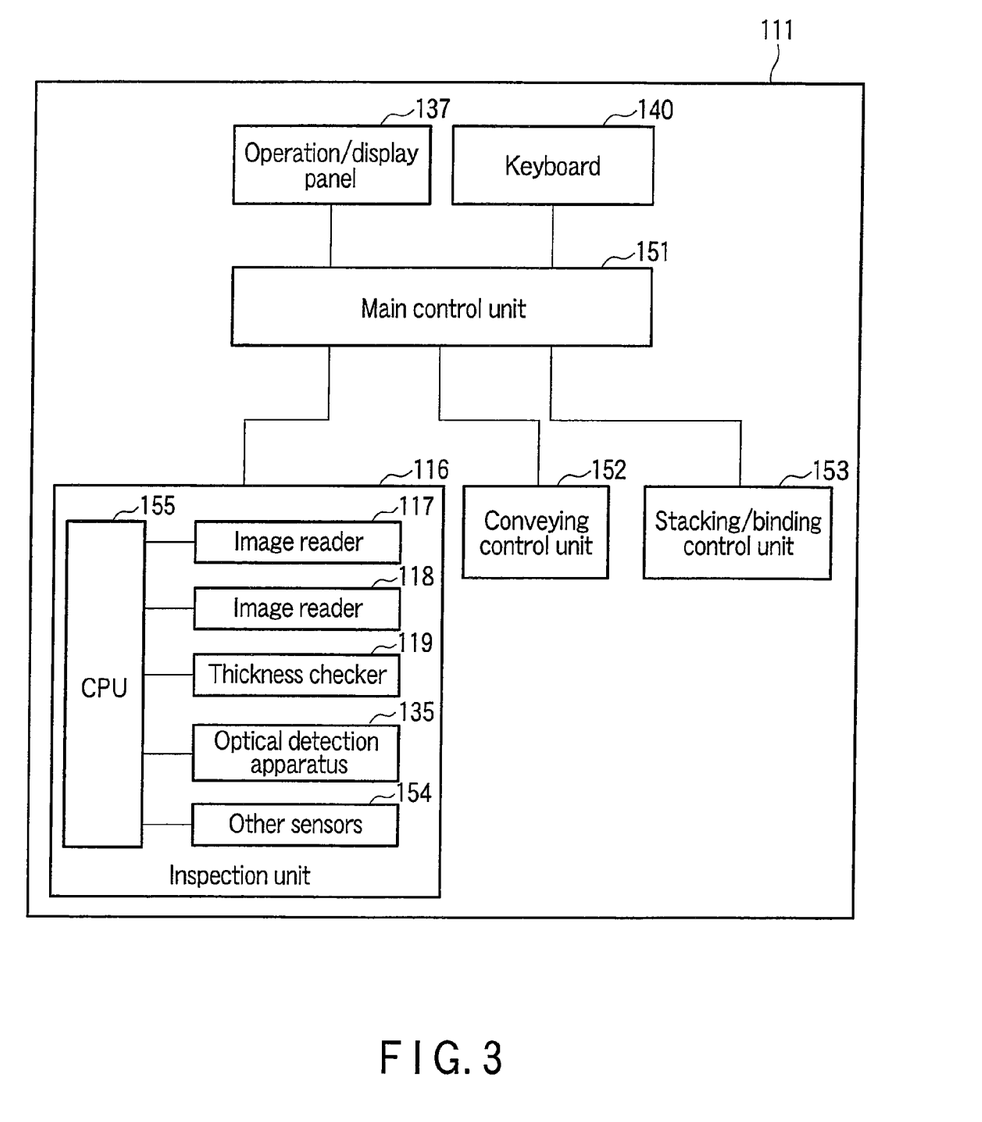
FIG. 3 is a block diagram for explaining an example of configuration of the sheet processing apparatus shown in FIGS. 1 and 2.

FIG. 3 is a block diagram for explaining an example of configuration of a control system of the sheet processing apparatus 111 shown in FIGS. 1 and 2.

As shown in FIG. 3, the inspection unit 116, conveying control unit 152, stacking/binding control unit 153, operation/display panel 137 and keyboard 140 are connected to the main control unit 151 which controls the whole apparatus.

The main control unit 151 controls the whole sheet processing apparatus 111. The main control unit 151 controls the conveying control unit 152 and stacking/binding control unit 153, based on the operations input from the operation/display panel 137 and the inspection result from the inspection unit 116.

The inspection unit 116 has image readers 117 and 118, a thickness checker 119, the optical detection apparatus 135, other sensors 154, and a CPU 155.

The image readers 117 and 118 read images of both sides of a sheet conveyed on the conveying path 115. The thickness checker 119 checks the thickness of a sheet conveyed on the conveying path 115.

The optical detection apparatus 135 detects fluorescence and afterglow from a sheet conveyed on the conveying path 115, and obtains fluorescent and phosphorescent printed information.

The other sensors 154 include a magnetic sensor, for example. A magnetic sensor detects magnetic characteristic information from a sheet conveyed on the conveying path 115.

The CPU 155 determines the kinds, stains and damage, front and back sides, and authenticity of a sheet conveyed on the conveying path 115, based on the inspection results from the image readers 117 and 118, thickness checker 119, optical detection apparatus 135 and other sensors 154.

The conveying control unit 152 controls the take-out unit 113, conveying path 115, rejection conveying path 126, and gates 120 to 125, under the control of the main control unit 151. Thereby, the conveying control unit 152 controls taking-in and conveying of a sheet. Further, the conveying control unit 152 sorts sheets according to kinds. In other words, the conveying control unit 152 functions as a sorting processor.

The stacking/binding control unit 153 controls the rejection stacker 127 and stacking/binding control units 128 to 131, under the control of the main control unit 151. Thereby, the stacking/binding control unit 153 controls stacking and binding of sheets.

Figure 4:
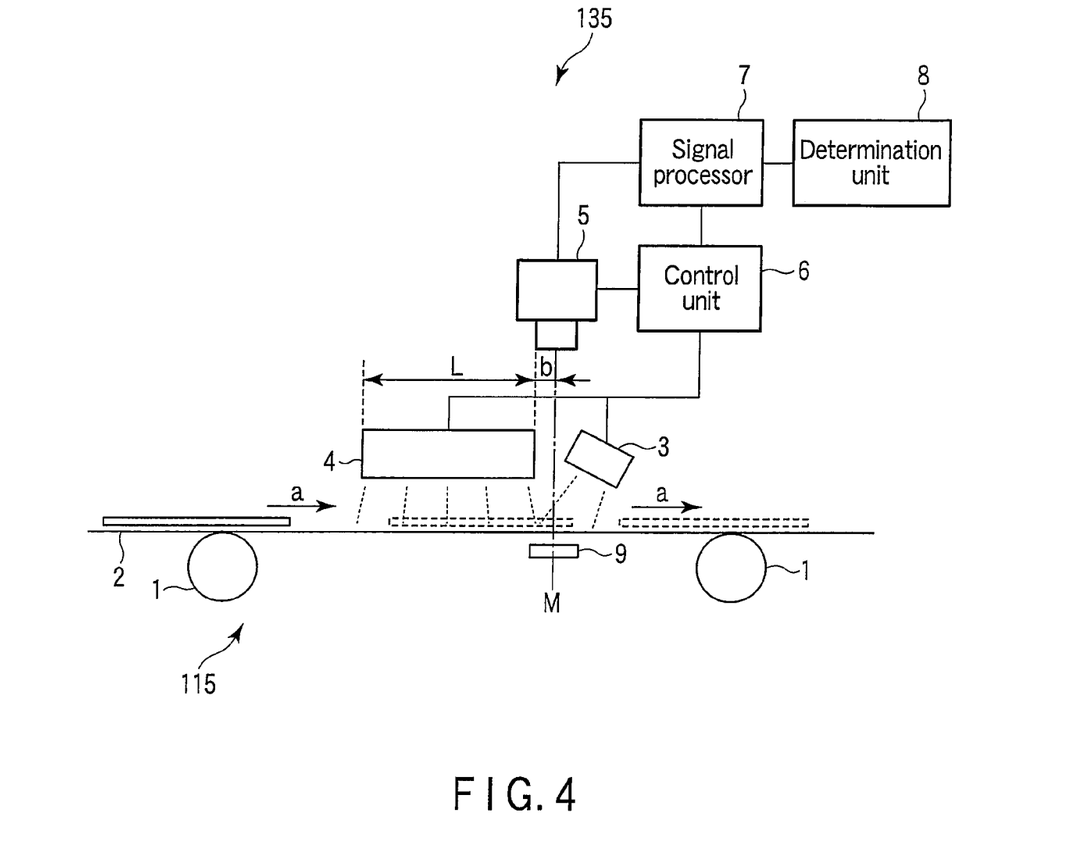
FIG. 4 is an explanatory diagram showing an example of configuration of the optical detection apparatus shown in FIGS. 2 and 3.

FIG. 4 is an explanatory diagram showing a configuration of the optical detection apparatus 135 shown in FIGS. 2 and 3.

As shown in FIG. 4, the optical detection apparatus 135 is provided in the vicinity of the conveying path 115 comprising a conveying belt 1 and a driving pulley. The conveying path 115 conveys a sheet in the direction of the arrow a.

The optical detection apparatus 135 has a first illuminator 3, a second illuminator 4, a detector 5, a control unit 6, a signal processor 7, a determination unit 8, and a reference plate 9.

The control unit 6 controls the whole optical detection apparatus 135. The control unit 6 has a CPU, a buffer memory, a program memory, and a nonvolatile memory. The CPU performs arithmetic processing. The buffer memory temporarily stores the arithmetic processing results from the CPU. The program memory and nonvolatile memory store various programs and control data executed by the CPU. The control unit 6 can perform various processing by executing the programs stored in the program memory by the CPU.

The detector 5 is a line image sensor using a CMOS or CCD, for example. The detector 5 receives light from a reading position M shown in FIG. 4, and converts the light into an electric signal at the timing controlled by the control unit 6. Namely the detector 5 detects image data in a predetermined reading area on a conveying path to convey the sheet. The reading area includes the reading position M.

The detector 5 uses an array sensor such as a color line image sensor for separating the colors of the detected light. When the color separation is unnecessary, the detector 5 consists of a monochrome image sensor or a photodiode array. When it is unnecessary to take a width in the scanning direction, the detector 5 may be realized by a single light-receiving element.

Further, the detector 5 may consist of a rear-incident image sensor. The detector 5 may also consist of a time delay integration (TDI) image sensor. When a single light-receiving element is used for the detector 5, the detector 5 may consist of an Avalanche photodiode, or a photo multiplier.

The first illuminator 3 emits ultraviolet rays as an excitation light. The first illuminator 3 emits a belt-like excitation light in a direction perpendicular to the sheet conveying direction a. In this case, the first illuminator 3 emits an excitation light at least to an area read by the detector 5 (a first illumination area).

The first illuminator 3 is intermittently lit. In other words, the first illuminator 3 is continuously turned on and off under the control of the control unit 6.

The control unit 6 determines the timing of turning on and off the first illuminator 3 to a size of one resolution obtained by the detector 5. For example, when the detector 5 detects light in 0.5 mm for one resolution at a sheet conveying speed of 10 m/s, the control unit 6 controls the detector 5 to detect light at a cycle of 50 µs, that is, at 20 kHz.

The second illuminator 4 emits ultraviolet rays as an excitation light, like the first illuminator 3. The second illuminator 4 continuously emits an excitation light. The second illuminator 4 emits the excitation light in an area of a distance L (a second illumination area) along the sheet conveying direction a. The second illumination area does not include at least the reading position M of the detector 5. The second illumination area is continued with the first illumination area on the upstream of the first illumination area on the conveying path.

The second illuminator 4 is an illuminator for lighting and saturating fluorescent and phosphorescent substances. In other words, a sheet conveyed on the conveying path 115 is illuminated by the second illuminator 4 for the time while it is conveyed in the area close to the second illuminator 4 (the distance L/conveying speed).

The distance L is decided based on the emission saturation time of the fluorescent and phosphorescent substances coated on a sheet, and the sheet conveying speed. In other words, the time while a sheet is conveyed in the area close to the second illuminator 4 (the distance L/conveying sped) needs to be longer than the emission saturation time. For example, when the conveying speed is 10 m/s and the lighting-saturating time is 3 ms, the distance L needs to be at least longer than 30 mm. When the sheet processing apparatus 111 can change a conveying speed, the distance L is decided on the basis of a fastest conveying speed.

As shown in FIG. 4, the first and second illuminators 3 and 4 are read along the conveying path 115 below and on both sides of the detector 5. In other words, the second illuminator 4 is located in the upstream of the reading position M of the detector 5, and the first illuminator 3 is located in the downstream.

As described above, the first illuminator 3 emits light to a first illumination area including a reading area of the detector 5 close to the reading position M. The second illuminator 4 emits light to a second illumination area not including the reading position M of the detector 5. As shown in FIG. 4, the second illuminator 4 is positioned with a distance d between the second illumination area and the reading position M of the detector 5.

The first illuminator 3 is intermittently lit at a high speed, and is composed of an LED, for example. The second illuminator 4 consists of a fluorescent lamp to emit ultraviolet rays, or a cold-cathode tube. The second illuminator 4 is lit with a high frequency, and can continuously emit ultraviolet rays.

Recently, the luminance of an LED has been increased, and LEDS arranged like an array along the conveying path 115 may be used as a second illuminator 4. It is also possible to use an illuminator, which emits light like a line to align with a detecting position, by a light source such as a mercury lamp to emit light including ultraviolet rays.

Further, the above embodiment has been explained based on the premise that the fluorescent and phosphorous substances emit ultraviolet rays as an excitation light. However, the embodiment is not limited to this. The fluorescent and phosphorescent substances applied to a sheet to be inspected emit an excitation light with different wavelengths according to kinds of a sheet. Therefore, it is necessary to change the characteristics of the first and second illuminators 3 and 4. For example, the first and second illuminator 3 and 4 may consist of a visible monochrome illuminator and an infrared illuminator.

The control unit 6 controls the detector 5 to synchronize the timing of detecting light with the turning on and off of the first illuminator 3. In other words, the control unit 6 controls the detector 5 to detect a fluorescent image of the sheet after an elapse of a given time period after the first illuminator 3 turns on. And the control unit 6 controls the detector 5 to detect an afterglow image of the sheet after an elapse of a given time period after the first illuminator 3 turns off.

The signal processor 7 amplifies a signal detected by the detector 5 with a predetermined gain. In other words, the signal processor 7 amplifies an electric signal converted from light by the detector 5 with an amplifier, for example.

Afterglow and fluorescence are largely different in the level of a signal detected by the detector 5. The intensity of afterglow is lower than fluorescence. Thus, the detector 5 may detect a signal with a very low level when detecting afterglow by the setting used for detecting fluorescence. This makes it impossible to obtain effective data.

To solve the problem, the control unit 6 changes the gain of the signal processor 7 with time. In other words, the control unit 6 controls the detector 5 to increase the gain of the signal processor 7 when detecting afterglow. The control unit 6 controls the detector 5 to decrease the gain of the signal processor 7 when detecting fluorescence. Thereby, the optical detection apparatus 135 can obtain signals with the same level from fluorescence and afterglow.

The signal processor 7 performs analog-to-digital conversion for a detected signal. In other words, the signal processor 7 obtains detected data by sampling a detected signal. Further, the signal processor 7 divides the data. In other words, in the above-mentioned configuration, the data detected from fluorescence and afterglow are alternately arranged. The signal processor 7 divides the data into the data detected from fluorescence and data detected from afterglow.

The signal processor 7 performs the above processing for the data obtained from one whole sheet. Thereby, the signal processor 7 obtains a fluorescent image and an afterglow image of a sheet.

The determination unit 8 determines whether the obtained sheet data includes fluorescent printed information and phosphorescent printed information, based on the fluorescent image and phosphorescent image obtained from the signal processor 7. The determination unit 8 previously stores a reference data for a fluorescent image (a reference fluorescent image) and a reference data for an afterglow image (a reference afterglow image). The determination unit 8 compares the fluorescent image obtained from the signal processor 7 with the reference fluorescent image, and determines whether the obtained data includes fluorescent printed information. Further, the determination unit 8 compares the afterglow image obtained from the signal processor 7 with the reference afterglow image, and determines whether the obtained data includes fluorescent printed information.

The reference plate 9 gives the detector 5 a reference light to correct the gain of the signal processor 7. As shown in FIG. 4, the reference plate 9 is provided at a position opposite to the detector 5 across the conveying path 115. A light-emitting plane is formed on the surface of the reference plate 9 opposing the detector 5 at a position overlapping with the reading position M of the detector 5. The light-emitting plane is made of material including a fluorescent substance, or a fluorescent layer coated with fluorescent ink. A fluorescent substance included in the light-emitting plane has the same characteristic as the fluorescent substance applied to a sheet to be inspected.

When an excitation light is emitted to the reference plate 9, the reference plate 9 emits fluorescence to the detector 5. The control unit 6 adjusts the gain based on the level of the signal detected from the fluorescence emitted from the reference plate 9. In other words, the control unit 6 controls the signal processor 7 so that the level of the signal detected from the fluorescence emitted from the reference plate 9 always becomes a predetermined value. In this case, the control unit 6 functions as a corrector.

Figure 5:
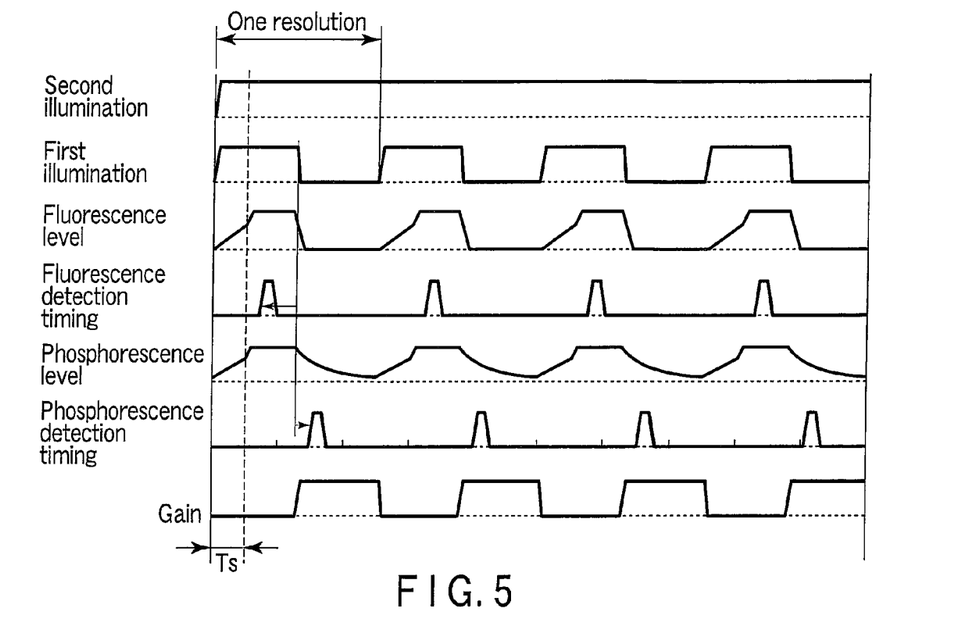
FIG. 5 is a timing chart for explaining the timing of operations of each part of the optical detection apparatus shown in FIG. 4.

FIG. 5 is a timing chart for explaining the timing of operations of each part of the optical detection apparatus 135 shown in FIG. 4.

As shown in FIG. 5, the second illuminator 4 always emits an excitation light. The first illuminator 3 repeats turning on and off at a predetermined timing. In other words, the first illuminator 3 intermittently turns on and off at a cycle equivalent to one resolution (one line).

The detector 5 detects light after a predetermined time Ts after the first illuminator 3 is turned on. In this case, the detector 5 detects fluorescence. The predetermined time Ts is determined based on the distance from the reading position M of the detector 5 to the second illumination area of the second illuminator 4, and the sheet conveying velocity v. Namely, the equation Ts=d/v is established.

A sufficient excitation light may not be applied to a sheet, which is conveyed to the reading position M immediately after the first illuminator 3 turns on. Because, a part of sheet existing between the end of the second illumination area close to the detector 5 and the reading position M is conveyed to the reading position M immediately after the first illuminator 3 turns on.

On the other hand, a part of sheet existing within the second illumination area immediately after the first illuminator turns on quits the second illumination area, and is conveyed into the first illumination area. Therefore, a sheet is conveyed to the reading position M in the state being sufficiently excited.

Namely, a sheet is determined to have been sufficiently excited if it is conveyed by the distance d after the first illuminator 3 turns on. Therefore, the detector 5 detects fluorescence after the time Ts required to convey a sheet by the distance d at the conveying velocity v.

Further, the detector 5 detects light after the first illuminator 3 turns off. In this case, the detector 5 aims at detecting afterglow emitted from a phosphorescent substance. Therefore, it is preferable to detect afterglow in the state that afterglow is not emitted from a fluorescent substance and the intensity of afterglow emitted from a phosphorescent substance is as strong as possible. Therefore, the detector 5 detects afterglow after elapse of the attenuation time of a fluorescent substance.

The signal processor 7 adjusts the gain according to the timing of turning on and off the first illuminator 3. In other words, the signal processor 7 decreases the gain when the first illuminator 3 turns on, and increases the gain when the first illuminator 3 turns off.

Figure 6:
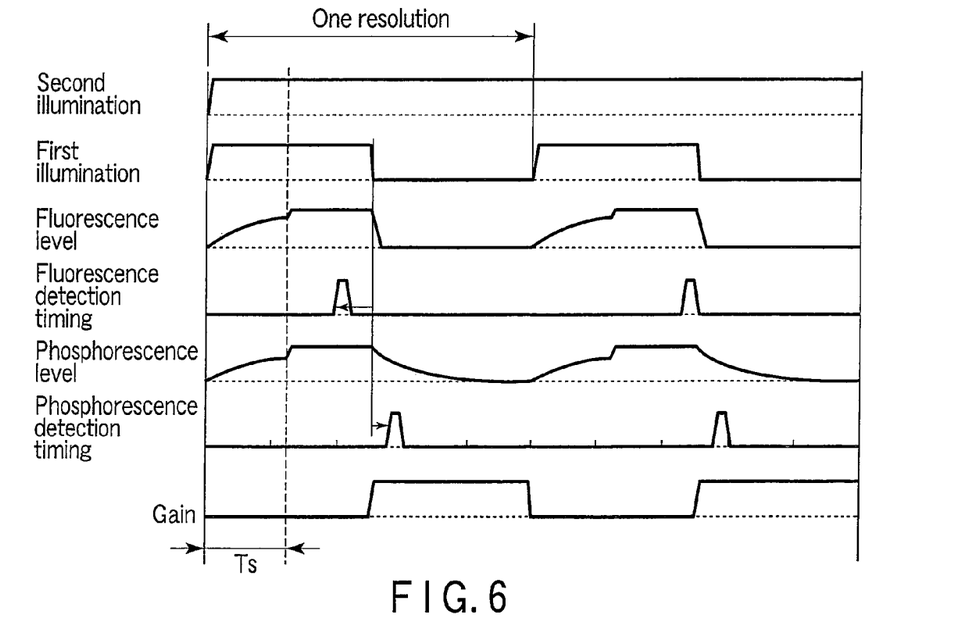
FIG. 6 is a timing chart for explaining the timing of operations of each part of the optical detection apparatus shown in FIG. 4.

FIG. 6 is a timing chart for explaining the timing of operations of each part of the optical detection apparatus 135 shown in FIG. 4. FIG. 6 shows an example, in which the conveying velocity v is different from the example shown in FIG. 5.

As shown in FIG. 6, the conveying velocity is slower than the example shown in FIG. 5. Thus, the processing time for one line is longer. An interval between turning on and turning off the first eliminator 3 is longer.

As seen above, even if the conveying velocity is changed, the detector 5 can detect fluorescence in the saturated emission state by detecting fluorescence after the time Ts required to convey a sheet by the distance d. Further, the detector 5 can detect a high-level afterglow by making detection after the attenuation time of a fluorescent substance.

As descried hereinbefore, the optical detection apparatus 135 according to an embodiment of the invention has a first illuminator which is intermittently lit, and a second illuminator 4 which is always lit. The detector 5 detects light a certain time after the first illuminator 3 turns on, and after the attenuation time of a fluorescent substance after the first illuminator 3 turns off. With this configuration, one detector can detect both fluorescence emitted from a fluorescent substance, and afterglow emitted from a phosphorescent substance. As a result, it is possible to provide a optical detection apparatus which can detect two or more light having different characteristics with a simple structure, and a sheet processing apparatus having the optical detection apparatus.

In the embodiment described herein, the second illuminator 4 has been explained as a component to emit an excitation light over the distance L along the conveying direction a. However, the invention is not limited to this configuration. For example, when the second illuminator is an LED array, the second illuminator 4 may be configured to control the distance L to emit an excitation light according to a sheet conveying speed. In other words, the distance to limit an excitation light is determined based on the conveying speed and emission saturation time, and the LEDS arranged like an array are lit by the number corresponding to the determined distance. In such a configuration, a second illumination area corresponding to the emission saturation time of fluorescent and phosphorescent substances can be realized.

Further, the second illuminator 4 may consist of LEDS arranged like an array for emitting light with different wavelengths. Some kinds of sheet to be processed by the sheet processing apparatus 111 may be coated with different fluorescent substance and phosphorescent substance. These kinds of sheet can be detected by providing LEDS for emitting light with different wavelengths to meet each kind of sheet.

The second illuminator 4 may be configured to control the amount of light emission. In other words, the second illuminator 4 controls the amount of light emitted from LED elements arranged in two dimensions. In this case, the optical detection apparatus 135 previously stores the amount of light emission, with which the lighting amount of fluorescent or phosphorescent printed information becomes constant at every speed, as reference data. The control unit 6 of the optical detection apparatus 135 refers to the reference data, and controls the amount of light emission according to a conveying speed. Thereby, the optical detection apparatus 135 can always obtain a detection signal with the same level, regardless of a sheet conveying speed.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An optical detection apparatus for detecting fluorescence and afterglow from a sheet printed with fluorescent substance and phosphorescent substance, comprising:
    a detector configured to detect image data in a predetermined reading area on a conveying path to convey the sheet;
    a first illuminator configured to intermittently emit an excitation light to a first illumination area including the reading area of the detector;
    a second illuminator configured to continuously emit an excitation light to a second illumination area which is continued with the first illumination area on the upstream of the first illumination area on the conveying path and which does not include the reading area of the detector; and
    a control unit configured to control the detector to detect the fluorescent image and the afterglow image of the sheet according to the emitting operation of the first illuminator.

2. The optical detection apparatus according to claim 1, wherein the control unit is configured to control the detector to detect the fluorescent image of the sheet after an elapse of a given time period after the first illuminator turns on, and detect the afterglow image of the sheet after an elapse of a given time period after the first illuminator turns off.

3. The optical detection apparatus according to claim 1, wherein the second illuminator controls the second illumination area according to emission saturate time of the fluorescent substance and phosphorescent substance, and a conveying speed of the sheet.

4. The optical detection apparatus according to claim 1, wherein the second illuminator controls a wavelength of emitted light according to excitation characteristics of the fluorescent substance and phosphorescent substance.

5. The optical detection apparatus according to claim 1, further comprising:
    a reference plate provided at the reading area of the detector to oppose the detector across the conveying path; and
    a correction unit configured to correct the level of a signal detected by the detector based on a light emitted from the reference plate.

6. A sheet processing apparatus comprising:
    a conveyer configured to convey a sheet along a conveying path;
    a detector configured to receive light from a predetermined reading area on the conveying path, and to detect image data of the sheet;
    a first illuminator configured to intermittently emit an excitation light to a first illumination area including the reading area of the detector;
    a second illuminator configured to continuously emit an excitation light to a second illumination area which is continued with the first illumination area on the upstream of the first illumination area on the conveying path and which does not include the reading area of the detector;
    a control unit configured to control the detector to detect a fluorescent image and afterglow image of the sheet according to the emitting operation of the first illuminator;
    a determination unit configured to determine whether the sheet is printed with fluorescent printed information and phosphorescent printed information or not based on a fluorescent image and phosphorescent image detected by the detector; and
    a sorting processor configured to determine a kind of the sheet based on the result of determination by the determination unit, and sort the sheet according to the kind of the sheet.

* * * * *